H. TALLEY.
SHELL CARRIER AND SHUTTLE.
APPLICATION FILED APR. 24, 1912.
1,105,936.
Patented Aug. 4, 1914.
3 SHEETS—SHEET 1.
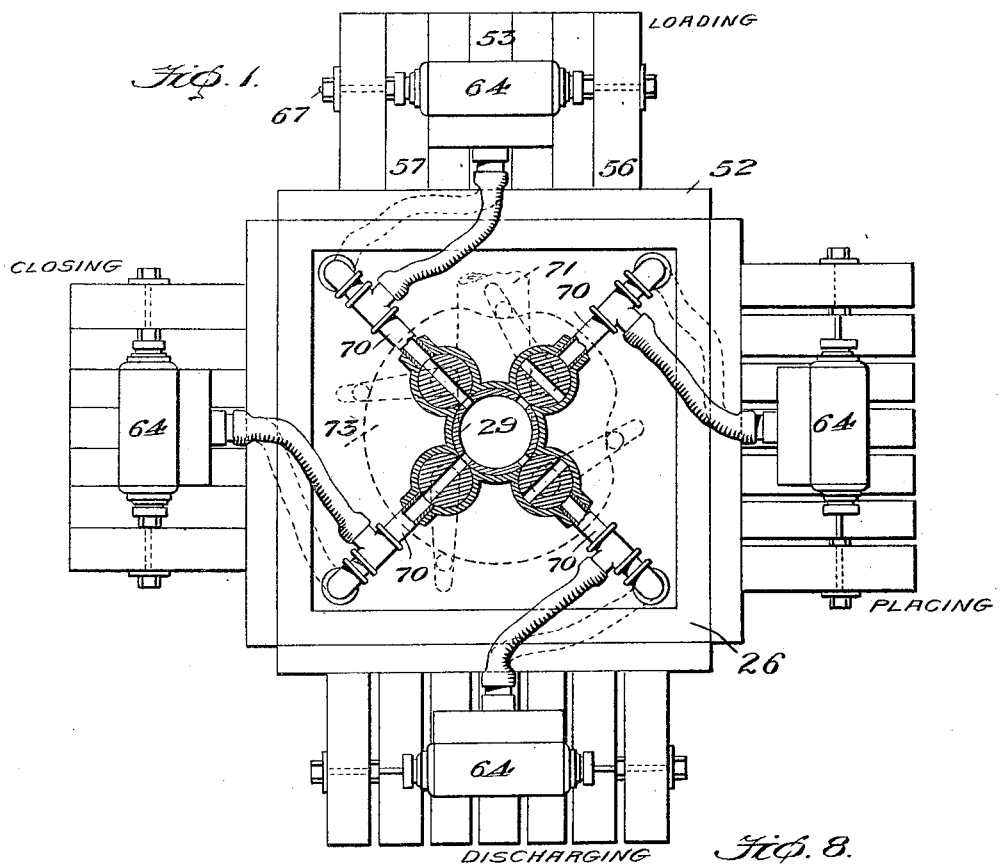
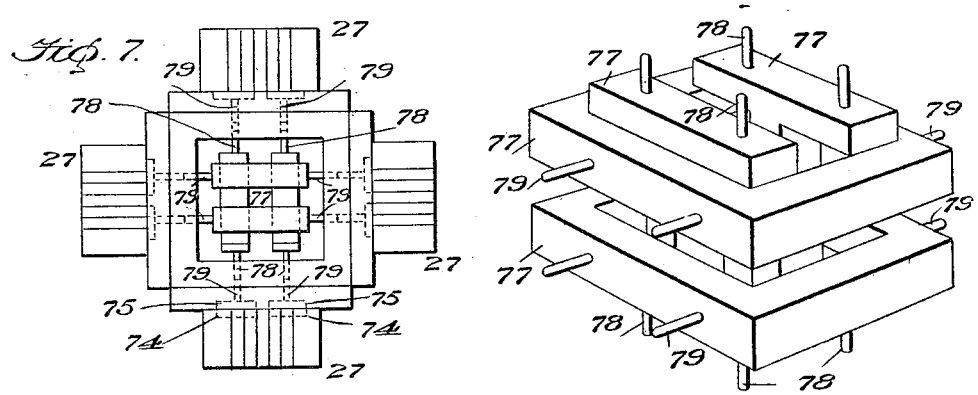

H. TALLEY.
SHELL CARRIER AND SHUTTLE.
APPLICATION FILED APR. 24, 1912.
1,105,936. Patented Aug. 4, 1914.
3 SHEETS—SHEET 2.
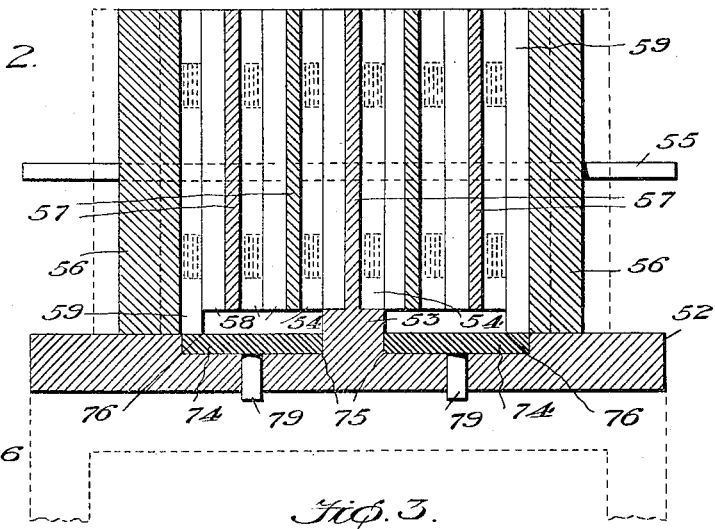
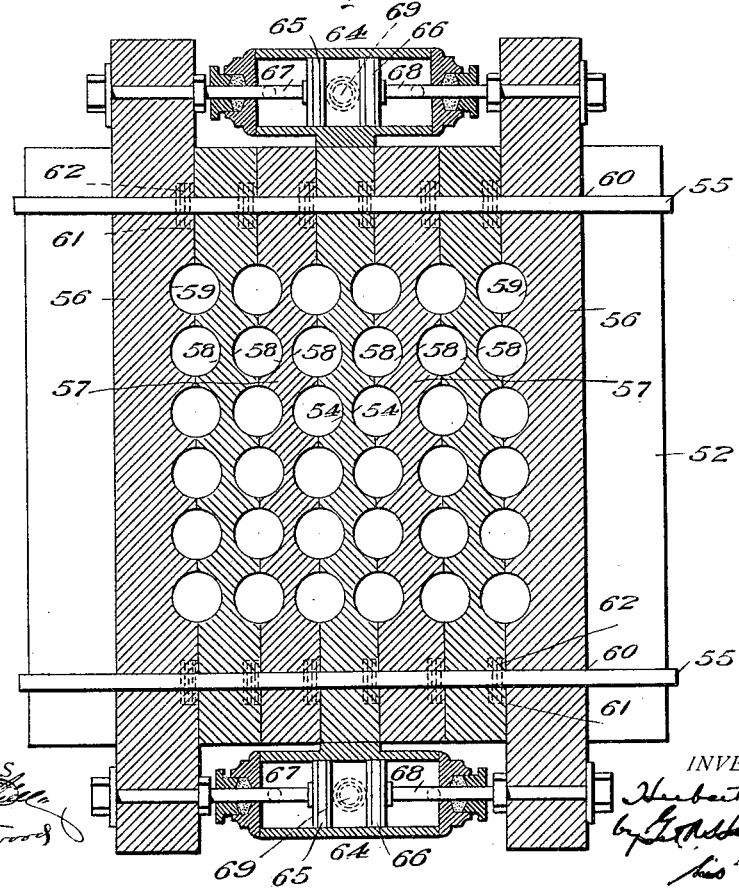

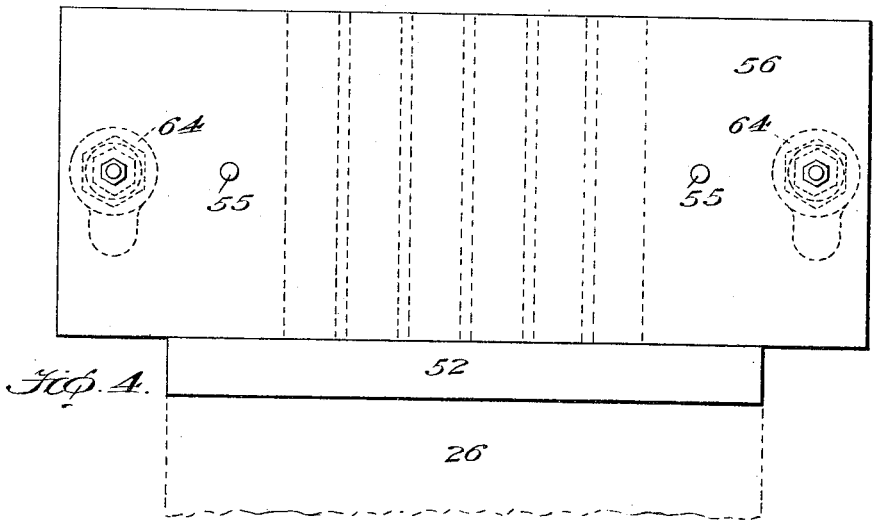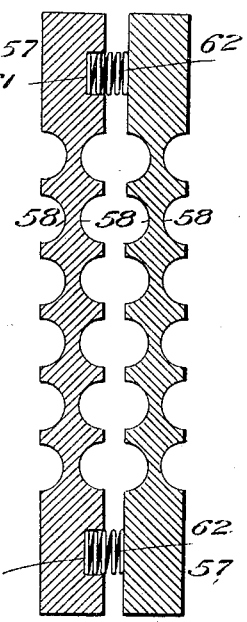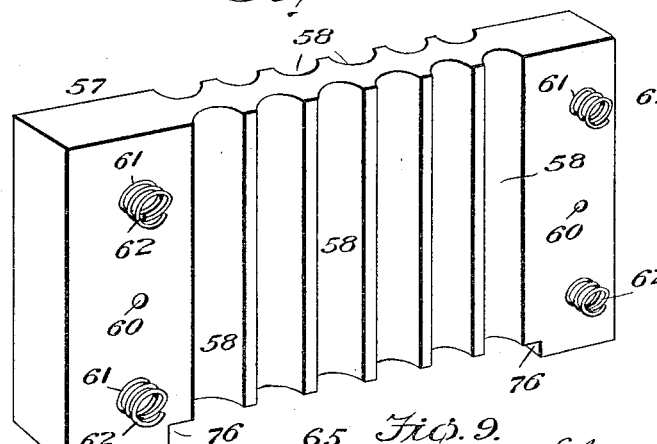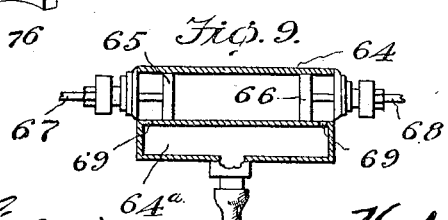

UNITED STATES PATENT OFFICE.

HERBERT TALLEY, OF JOPLIN, MISSOURI, ASSIGNOR, BY MESNE ASSIGNMENTS, TO HERCULES POWDER COMPANY, A CORPORATION OF DELAWARE.

SHELL CARRIER AND SHUTTLE.

1,105,936.      Specification of Letters Patent.      Patented Aug. 4, 1914.

Application filed April 24, 1912. Serial No. 692,932.

*To all whom it may concern:*

Be it known that I, HERBERT TALLEY, a citizen of the United States, residing at Joplin, county of Jasper, and State of Missouri, have invented certain new and useful Improvements in Shell Carriers and Shuttles, of which the following is a specification.

This invention relates to shell carriers and shuttles.

Gelatin dynamite is now commonly loaded into paper shells or cartridges by machines which load or fill a plurality of the shells simultaneously. In such machines, the shells are held in groups in shuttles which are in turn carried by a movable carrier so that the respective groups may be successively brought into position for filling.

The present invention relates to shell carriers and shuttles for this purpose and it has for its objects, first, the provision of a shuttle which in and of itself is of novel construction, whereby it is opened and closed by springs and a motive fluid pressure operated motor and, further, to provide in a shuttle a new arrangement of leaves between which the shells are held, and still further, to provide novel means for insuring the ejection of the shells from the shuttle.

In its second aspect, the invention has for its object the provision of a carrier and shuttles carried thereby, the shuttles to have shell loosening or ejecting means adapted for conjoint use, whereby different shuttles are coöperatively related to facilitate the loosening and ejection of the shells after they have been loaded and closed.

In respect to both the shuttle by itself and to the combination of shuttles on a common carrier, the invention has for its object to overcome the tendency of the loaded shells to stick to the leaves of the shuttles and to assist gravity in insuring the dumping of all the shells that have been loaded and closed.

The invention consists, first, in a shuttle having its leaves constructed and arranged in a new manner; second, in the provision of shell ejecting means for the shuttle; third, in the provision of new means for opening and closing the leaves of a shuttle.

The invention consists, further, in a carrier and shuttles carried thereby, and a common actuating device on the carrier adapted for coöperation with the shell ejecting means on the plurality of shuttles mounted on said carrier.

In the accompanying drawings:—Figure 1 is a front elevation of the complete carrier and shuttles, the valves being in section and certain parts in dotted lines; Fig. 2, a longitudinal section through one of the shuttles, shown in closed position, certain parts being in dotted lines, the opening movement of the leaves being represented by dotted lines; Fig. 3, a horizontal section through the shuttle when closed; Fig. 4, a view looking toward one of the end leaves of the shuttle; Fig. 5, a horizontal section through a pair of leaves, showing the springs; Fig. 6, a perspective view of a leaf showing how the springs are mounted; Fig. 7, a diagrammatic elevation of the carrier and shuttles showing the weights in the interior of the carrier; Fig. 8, a detail perspective view of the weights which actuate the platforms of the shuttles, and Fig. 9, a detail view showing the arrangement of ports for the cylinder.

The shell holder may be single or double, the latter construction being shown and preferably employed as it has double the capacity.

Rising from and secured to the base 52 is a stationary center leaf 53 having grooves 54 on its opposite sides. Projecting in opposite directions from the center leaf are guide rods 55. The end leaves are shown at 56 and the intermediate leaves at 57. The intermediate leaves have grooves 58 on their opposite sides corresponding to the end leaves grooves 59. The grooves are substantially semi-circular in cross-sectional outline and are adapted to form the respective shell holding pockets. The leaves 56, 57 have holes 60 which loosely receive the rods 55. The leaves have countersunk portions 61 in which are received and held springs 62 whose projecting parts bear against mating leaves. Four springs are interposed between each pair of leaves, two at each end, whereby the leaves are adapted to open quickly and easily. To close the leaves, there are provided at each end of the center leaf 53 cylinders 64 which may be suitably attached thereto in any preferred manner. Within the cylinders are pistons 65, 66, having piston rods 67, 68, connected to the respective end leaves 56. The cylinders have ports 69 opening thereinto from a chest 64$^a$, said ports being located between the respective pistons 65, 66, and the cylinder heads (Fig. 9), so that on the admission of air, the pistons are forced toward each other against the action of the springs 62, thus closing the leaves together and holding the shells in the pockets between the leaves. When the pressure is released, the springs 62, immediately open the leaves, permitting empty shells to be inserted in the pockets or any shells held thereby to be released.

In the use of the shell holders or shuttles there is sometimes a tendency on the part of a few of the loaded shells, to stick to the leaves of the shuttle so that discharge by gravity is prevented. To obviate this difficulty, I provide movable false bottoms 74 on which the shells are adapted to rest. The bottom or base 52 is provided with recesses 75 to permit the false bottoms to lie flush with the upper faces of said bottom 52 and the lower edges of the leaves 57 are recessed at 76 to permit the false bottoms to have a slight play outward. When the shuttle is inverted, the weight of the false bottom 74 causes the shells to be positively ejected and prevents any of them from adhering to the leaves, the recesses 76 then permitting the bottom 74 to move outwardly as the leaves have been previously opened.

As thus far described, the shuttle constitutes one part of the present invention. Another part of the invention consists in mounting the shuttles on a carrier 26 and in the provision of a common means to assist the gravity movement of the false bottom 74. Air may be supplied to the cylinder 64 in any preferred manner.

As set forth in my application on shell filling and closing machine Serial No. 691825, filed April 19, 1912, I prefer to supply air to the hollow shaft 29 of the carrier 26 by a pipe 71, from which pipes 70 lead to the cylinders 64, said pipes being provided with valves adapted to be turned to admit or cut off the air supply by a cam 73, the arrangement being such that the supply of air to the cylinders 64 of the shuttle 27 is cut off, when that shuttle is either in position to have shells placed therein or is in inverted and discharging position, the control of the valves by the cam being such that air will be admitted to the cylinders of the shuttles 27 which are in position where the shells contained therein may be loaded or in position for the closing or folding of the ends of the shells after loading.

To amplify the ejective action of the false bottoms 74 of the respective shuttles, I provide weights 77 adapted to coöperate therewith. These weights may be of any preferred material. In the present machine, I arrange the weights inside the carrier 26 and provide them with pins 78 slidable in openings in the carrier and adapted to abut against pins 79 on the false bottoms 74. To equalize the ejective action of the weights on the false bottoms, a plurality of pins 78 and 79 are provided to coöperate with each false bottom. Preferably, two of the weights 77 may be of open rectangular form and the remaining two of I-shape and extending therethrough and arranged crosswise of those of open rectangular form. With the arrangement set forth, the movable bottoms 74 of the shell holding shuttle which is uppermost and whose shells are in position to be loaded are in depressed position and the false bottoms 74 of the opposite shell holding shuttle which is in discharging position, receive the full ejective effect of the weights 77, thereby insuring the dumping of any shells which would tend to stick to the leaves.

Having thus described my invention, what I claim as new and desire to secure by Letters Patent, is:—

1. In a shell holding shuttle, the combination with a base and a stationary center leaf, of end leaves, intermediate loose leaves disposed between the end leaves and the center leaf, rods projecting from the center leaf which have a loose engagement with the loose leaves, springs interposed between the respective leaves adapted for opening them, and means for moving the end leaves to thereby close the intermediate loose leaves.

2. In a shell holding shuttle, the combination with a base and a stationary center leaf, of end leaves, intermediate loose leaves disposed between the end leaves and the center leaf, rods projecting from the center leaf which have a loose engagement with the loose leaves, springs interposed between the respective leaves adapted for opening them, and a fluid pressure motor for moving the end leaves to thereby close the intermediate loose leaves.

3. In a shell holding shuttle, the combination with a base and a stationary center leaf, of end leaves, intermediate loose leaves disposed between the end leaves and the center leaf, rods projecting from the center leaf which have a loose engagement with the loose leaves, springs interposed between the respective leaves adapted for opening them, stationary cylinders, a pair of pistons in each cylinder operatively connected to the end leaves, and means for admitting fluid pressure to the cylinders to cause the pistons to move the end leaves and thereby close the intermediate loose leaves.

4. In a shell holding shuttle, the combination with movable leaves, of rods loosely connecting said leaves together, springs for opening the leaves, and means for closing the leaves.

5. In a shell holding shuttle, the combination with a stationary leaf, of a movable end leaf, loose leaves interposed between the stationary leaf and the movable end leaf, and a fluid pressure motor coöperating with the movable end leaf to thereby move the intermediate loose leaves.

6. In a shell holding shuttle, the combination with a stationary leaf, of a movable end leaf, loose leaves interposed between the stationary leaf and the movable end leaf, springs coöperating with the loose leaves adapted to open them, and a fluid pressure motor adapted to move the end leaf and close the loose leaves.

7. In a shell holder, relatively movable shell holding leaves, and gravity operated means adapted for automatically ejecting the shells therefrom when said leaves are open.

8. In a shell holder having relatively movable shell holding leaves, a movable shell-ejecting bottom on which the shells are adapted to rest.

9. In a shell holder having relatively movable shell holding leaves, a movable bottom on which the shells are adapted to rest, in combination with a weight adapted to coöperate with said bottom to move said bottom.

10. In a shell holder having relatively movable shell holding leaves, a movable bottom on which the shells are adapted to rest, in combination with an impactive member adapted to coöperate with the bottom to move said bottom.

11. In a shell holder, the combination with a base, of shell holding leaves carried thereby adapted to open and close which have recessed inner edges, and a movable shell-ejecting bottom on which the shells are adapted to rest which is movable into the recessed edges of said leaves.

12. In a shell holder, the combination with a base, of shell holding leaves carried thereby adapted to open and close which have recessed inner edges, and a movable shell-ejecting bottom on which the shells are adapted to rest which is movable into the recessed edges of said leaves, the aforesaid base being provided with a recess in which the bottom is adapted to seat.

13. In a shell holder, the combination with a movable carrier, of a plurality of shell holding shuttles mounted on the carrier, shell ejecting means on the shell carrier for each of the respective shuttles adapted to engage with the shells, and a common operating device carried by said carrier and adapted for operating the respective shell ejecting devices.

14. In a shell holder, the combination with a movable carrier, of a plurality of shell holding shuttles mounted on the carrier, shell ejecting means for each of the respective shuttles adapted to engage with the shells, and a gravity-actuated operating device for the ejecting means of the shuttle, said operating device being carried by the carrier.

15. In a shell holder, the combination with a movable carrier, of a plurality of shell holding shuttles mounted thereon each having a shell ejecting device and adapted to be brought into substantially inverted position, and a common gravity-actuated operating device carried by the carrier adapted to coöperate with the ejecting devices of the shuttles when they are in substantially inverted position to actuate said ejecting devices.

16. In a shell holder, the combination with a movable carrier, of a plurality of shell holding shuttles each having means for engaging with and ejecting the shells therefrom.

17. In a shell holder, the combination with a movable carrier, of a plurality of shell holding shuttles each having means for engaging with and ejecting the shells therefrom, said carrier and shuttles being arranged so that the shuttles may be substantially inverted and said ejecting means being adapted to eject the shells when the shuttles are substantially inverted.

18. In a shell holder, the combination with a rotary carrier, of a plurality of shell holding shuttles carried thereby and arranged so that they may be successively brought into substantially inverted position by the rotation of the carrier, and shell ejecting means adapted to operate when the shell holding shuttles are brought into substantially inverted position.

19. In a shell holder, the combination with a carrier, of a plurality of shell holding shuttles each having a movable false bottom on which the shells are adapted to rest when in the shuttle, said shuttles being arranged to be brought into substantially inverted position during a part of their travel.

20. In a shell holder, the combination with a carrier, of a plurality of shell holding shuttles each having a movable false bottom on which the shells are adapted to rest when in the shuttle, said shuttles being arranged to be brought into substantially inverted position during a part of their travel, and a common operating device for said false bottoms which is carried by the carrier.

21. In a shell holder, the combination with a carrier, of a plurality of shell holding shuttles each having a movable false bottom on which the shells are adapted to rest when in the shuttle, said shuttles being arranged to be brought into substantially inverted position during a part of their travel, and a common gravity-actuated device carried by the carrier adapted to move the false bottom of each shell holding shuttle when the shuttle is in substantially inverted position.

In testimony whereof, I hereunto affix my signature in presence of two witnesses.

HERBERT TALLEY.

Witnesses:
GEO. B. PITTS,
S. V. LOCKWOOD.

Copies of this patent may be obtained for five cents each, by addressing the "Commissioner of Patents, Washington, D. C."